June 13, 1944.　　　A. B. WELTY　　　2,351,567
THRESHER
Filed Nov. 16, 1940　　　2 Sheets-Sheet 2

Inventor
Albert B Welty.
By Paul A. Pippel
Att'y.

Patented June 13, 1944

2,351,567

UNITED STATES PATENT OFFICE 2,351,567

THRESHER

Albert B. Welty, Moline, Ill., assignor to International Harvester Company, a corporation of New Jersey Application November 16, 1940, Serial No. 365,952

7 Claims. (Cl. 130—24)

This invention relates to an improved thresher construction. More particularly the invention relates to a novel grain separating mechanism mounting means which may be simply mounted and driven within the separator housing of a thresher.

In designing a mobile type of thresher, the main problem has been the reduction of weight in the machine, and the simplification of the drives for the various parts of the machine. It is desirable to make the thresher separator housing out of thin sheet iron. It will be appreciated, however, that a sheet iron housing will not serve as a supporting means for the various movable parts that are provided within the separator housing. It is, therefore, essential that the movable parts within the separator housing be so mounted and so driven that the vibration thereof is reduced to a minimum.

It is, therefore, an important object of the present invention to provide an improved mounting for a thresher separator housing.

Another object of the present invention is to provide a novel driving means for the grain-separating mechanism mounted within the thresher separator housing.

A further object of the invention is to provide a novel means for mounting the grain separating mechanism within the housing.

A still further object of the present invention is to provide a novel mounting for the main drive means which will operate with a minimum of vibration.

These and other advantages and objects of the present invention will be apparent to those skilled in the art after a consideration of the following detailed description of a preferred structural embodiment, taken in conjunction with the accompanying drawings.

Figure 1:
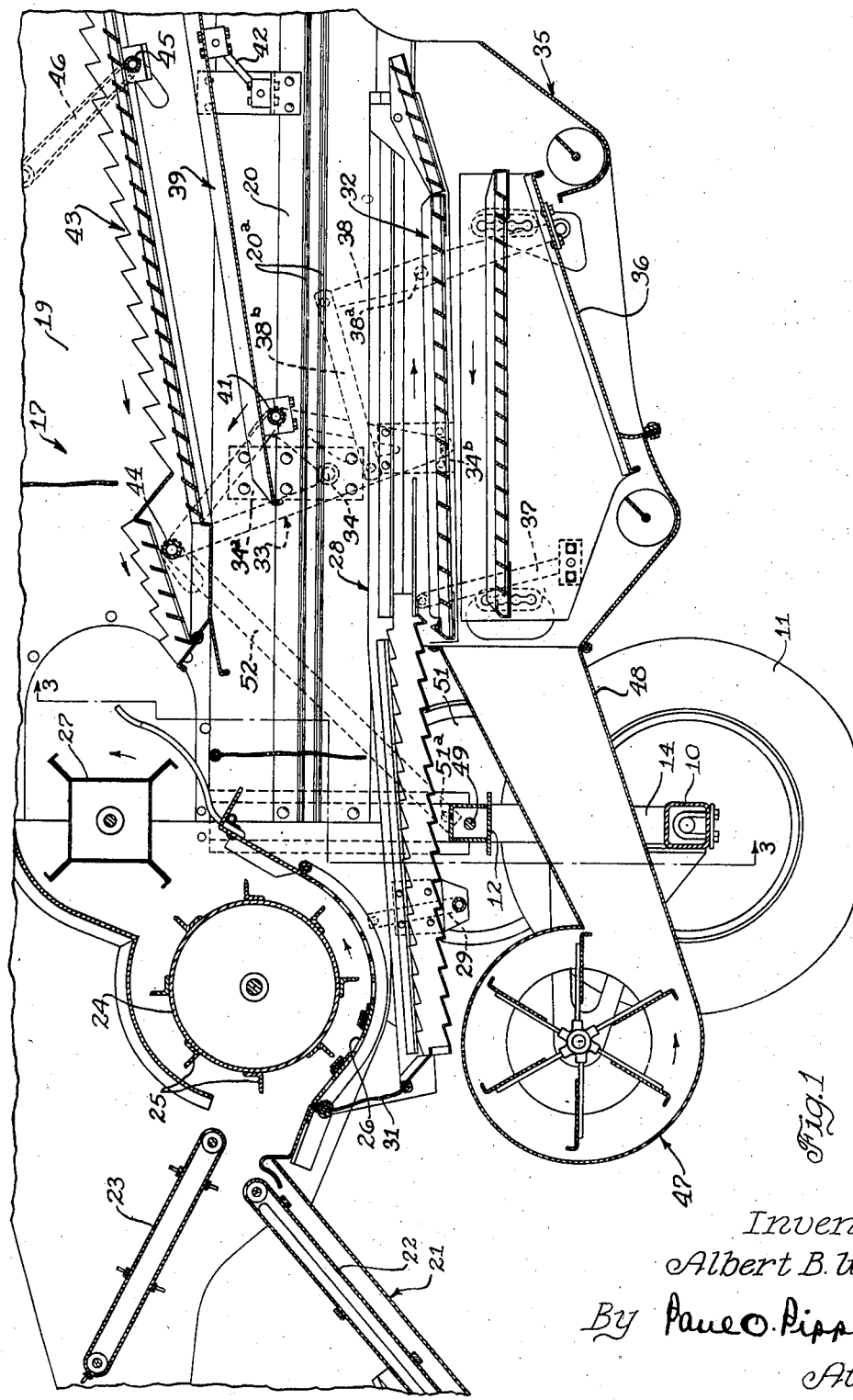
Figure 1 is a longitudinal sectional view through the separator housing of the thresher.
Figure 3:
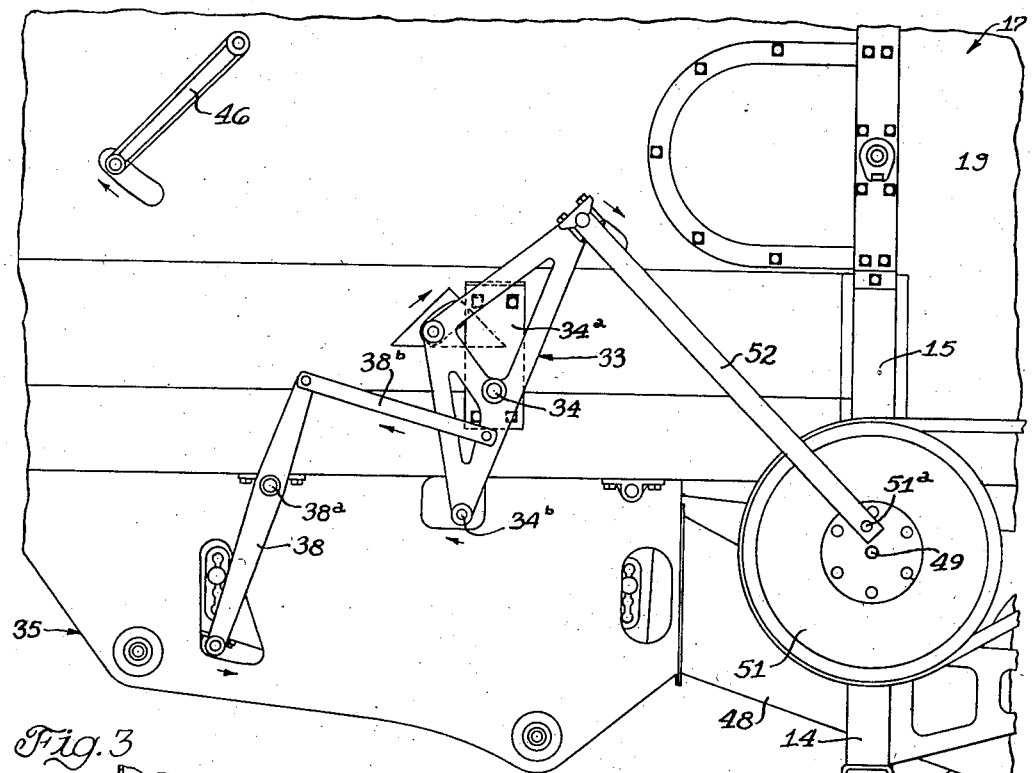

Referring now to the drawings, and more particularly to Figure 1, it is to be noted that the machine chosen to illustrate the principles of the present invention comprises a transversely disposed support 10, at the ends of which are rotatably mounted ground wheels 11, only one of which is shown. A second transverse support 12 is positioned above and parallel to the transverse support 10, and is secured thereto by vertical members 13 and 14. In the present case, the transverse supports 10 and 12 are made from hollow square tubing to reduce the weight of the machine. As shown in Figure 3, the right-hand vertical member 13 extends upwardly beyond the second transverse support 12 into a portion 15. At the left end of the second transverse support 12 extends a vertical member 16, similar to the portion 15 of the member 13. On the vertical members 15 and 16 is mounted the separator housing 17 of the thresher.

The thresher housing 17 comprises an inverted U-shaped housing which has side walls 18 and 19. As shown in Figure 3, the side walls 18 and 19 are secured to the vertical members 15 and 16. The side walls 18 and 19 are provided with longitudinally disposed reenforcing members 20 which are secured thereto by welding. The forward ends of the members 20 are bolted to the vertical members 15 and 16. The members 20 are provided with longitudinal ribs 20a. Within the separator housing 17 is mounted the threshing mechanism of the thresher. At the front of the separator housing is pivotally mounted a feeder 21 which consists of the usual canvas conveyor 22. An upper feed conveyor 23 is positioned above the canvas conveyor 22. At the rear of the feeder conveyor 21 is rotatably mounted a threshing cylinder 24, which is provided with the usual threshing elements 25 that are adapted to cooperate with a concave 26. A cylinder beater 27 is rotatably mounted at the rear of and above the cylinder 24. The material is cut or fed by the feeder 21 into the cylinder 24 where it is threshed in the usual manner. The threshed grain falls through suitable openings in the concave 26, and the straw is carried out of the cylinder 24 by the cylinder beater 27. The threshed grain falls from the concave 26 onto a reciprocating grain pan 28 which is pivotally mounted at the sides 18 and 19 of the thresher housing 17 by means of a pair of links 29. The front end of the grain pan is connected to the concave 26 by a piece of canvas 31 so as to prevent the loose grain from falling forwardly of the grain pan. The grain pan 28 extends rearwardly and is provided with an adjustable chaffer sieve 32, which is provided with the conventional openings that may be adjusted to accommodate the type of grain being threshed.

The rear of the grain pan 28 is supported by means of a pair of rocker arms 33, one of which is pivotally mounted at each side of the separator housing 17. The rocker arms 33 are pivotally mounted on a pin 34 which is secured to a plate 34a, which is bolted to the longitudinal members 20 and the sides 18 and 19 of the thresher housing 17. The lower end of each of the rocker arms 33 is pivotally connected to the rear of the grain pan 28 by a pin 34b. Below the rear of the grain pan 28 and on the separator housing 17 is mounted a grain and tailings return trough 35.

Within the grain return trough 35 is positioned an adjustable shoe 36, the forward end of which is pivotally connected to the separator housing sides 18 and 19 by a pair of shoe hanger links 37. The rear of the adjustable shoe sieve is pivotally mounted on a shoe hanger 38, which is also pivotally mounted on a pin 38a which is connected to the sides of the separator housing 17, as shown in Figure 1. Above the rear end of the grain pan 28 is provided a return grain pan 39, which is positioned so as to extend rearwardly upwardly from the end of the grain pan 28. The forward portion of the grain pan 39 is provided with a transverse bar 41, which extends through suitable openings provided in the separator sides 18 and 19, and is secured to suitable openings provided in the rocker arm 33. The bar 41 holds the grain pan in a rigid position. The rear of the return grain pan 39 is supported by a pair of links 42, one of which is secured to each side of the sides 18 and 19 of the separator housing 17.

Figure 2:
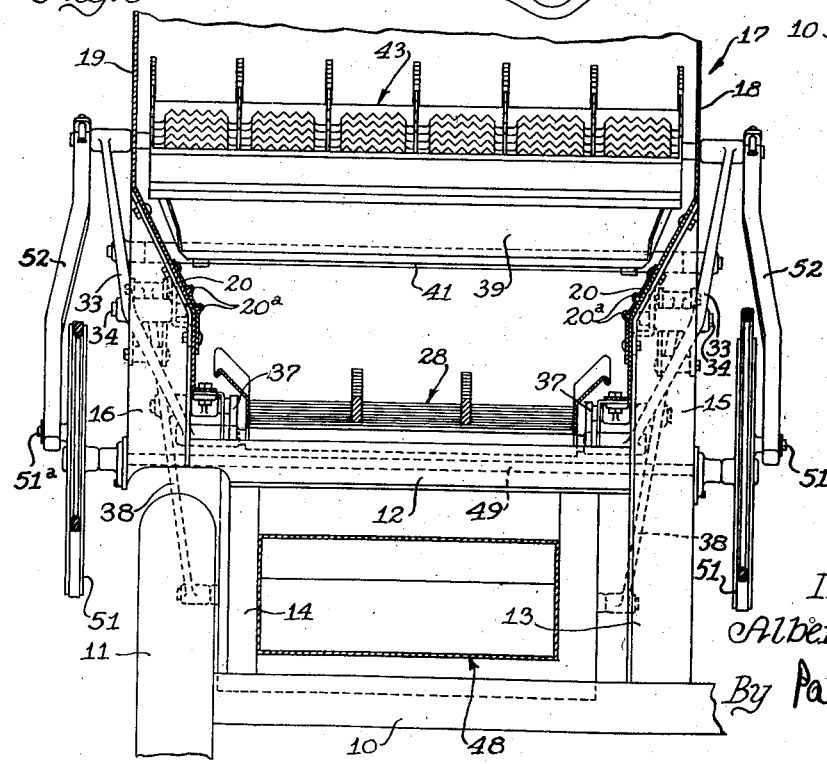
Figure 2 is a side view of the grain separator housing, and shows the drive means for the grain separating mechanism within the separator housing; and, Figure 3 is a sectional view taken along the line 3—3 of Figure 1.

Above the return grain pan 39 is positioned a straw rack 43. The straw rack 43 is a light weight construction and is supported on a transverse support pipe 44 at its front end, which extends outwardly through suitable openings provided in the separator sides 17 and 18, and is journaled in the rocker arms 33. The rear of the straw rack 43 is provided with a transverse support pipe 45 which also extends through suitable openings provided in the sides of the separator housings 17 and 18, and is pivotally mounted by a pair of arms 46, one of which is provided at each side of the separator housing 17 to the sides 18 and 19 thereof. The usual cleaning fan 47 is mounted between the transverse supports 10 and 12, and a duct 48 connects the fan 47 with the grain and tailings return trough 35. As shown in Figures 1 and 3, a shaft 49 is journaled in suitable bearings provided within the second transverse member 12 and the vertical supports 13 and 16. The shaft 49 extends outwardly beyond the vertical supports 13 and 16 and has a pulley 51 secured at each end thereof. One of the pulleys 51 is adapted to be driven from any suitable driving connection provided on the machine. A link 52 is connected to the transverse support pipe 44 of the straw rack 43 which is journaled in the rocker arms 33, and to the pulley 51 at a point 51a spaced from the axis of rotation of said pulley. By this particular construction, the shaft 49 may be driven from any suitable source of power by one of the pulleys 51 and a drive taken from the other pulley for driving another part of the machine. Upon rotation of the pulley 51, the arm 52 will impart a reciprocal movement to the rocker arm 33, which in turn imparts a reciprocal movement to the straw rack 43, the return grain pan 39, the grain pan 28, and the adjustable shoe sieve 36. The movements of the respective reciprocating parts within the separator housing 17 are indicated in Figures 1 and 2 by arrows. The shoe hangers 38 are connected to the rocker arm 33 by links 38b. By this particular arrangement of parts in the separator housing 17, a minimum of linkage is needed to drive the various parts. The main portion of the weight is carried on the rocker arms 33, which are carried by the longitudinal members 20. By positioning the drive shaft 49 within the transverse support 12, which is connected to the transverse support 10 by the vertical members 13 and 14, a minimum of vibration is given to the machine, since the transverse support 10 is supported on the wheels 11.

From the foregoing description it should be apparent that a novel mounting has been provided for the reciprocating parts provided within the separator housing of a thresher, and that a simplified driving means has been provided therefor. The majority of the weight of these reciprocating parts is carried by the rocker arms 33 which are carried by the longitudinal members 20 that are secured to the sides 18 and 19 of the separator housing 17. The straw rack construction and the return grain pan may be made of very light weight metal, since they are reenforced by the transverse support pipes 41 and 44.

While only a preferred construction, in which the principles of the present invention have been embodied, has been described, it is to be understood that the invention is not to be limited to the specific details shown and described, but that, in fact, widely different means may be employed in the broader aspects of the invention.

What is claimed is:

1. In a harvester thresher, a thresher separator housing, a straw rack, a return grain pan, a grain pan, and a shoe sieve positioned one above the other within said housing, a rocker arm pivotally mounted at each side of the separator housing, means pivotally connecting one end of the straw rack, return grain pan, and grain pan to the rocker arms, link means supporting the other end of the straw rack, return grain pan, and grain pan from the separator housing, shoe hangers pivotally connected to each side of the separator housing, means pivotally connecting the shoe sieve to the shoe hangers, and link means connecting the rocker arms and the shoe hangers.

2. In a harvester thresher, a thresher separator housing, a straw rack, a return grain pan, a grain pan, and a shoe sieve positioned one above the other within said housing, a rocker arm pivotally mounted at each side of the separator housing, means pivotally connecting one end of the straw rack, return grain pan, and grain pan to the rocker arms, link means supporting the other end of the straw rack, return grain pan, and grain pan from the separator housing, shoe hangers pivotally connected to each side of the separator housing, means pivotally connecting the shoe sieve to the shoe hangers, link means connecting the rocker arms and the shoe hangers, and means for moving said rocker arms about their pivotal connection to the separator housing.

3. In a harvester thresher, a thresher separator housing, a straw rack, a return grain pan, a grain pan, and a shoe sieve positioned one above the other within said housing, a rocker arm pivotally mounted at each side of the separator housing, means pivotally connecting one end of the straw rack, return grain pan, and grain pan to the rocker arms, link means supporting the other end of the straw rack, return grain pan, and grain pan from the separator housing, shoe hangers pivotally connected to each side of the separator housing, means pivotally connecting the shoe sieve to the shoe hangers, link means connecting the rocker arms and the shoe hangers, a transverse rotatable shaft associated with the separator housing, means for driving said shaft, and link means connecting the rocker arms and the shaft.

4. In a harvester thresher, a thresher separator housing, a straw rack, a return grain pan, a grain pan, and a shoe sieve positioned one above the other within said housing, a rocker arm pivotally mounted at each side of the separator housing, means pivotally connecting one end of the straw rack, return grain pan, and grain pan to the rocker arms, link means supporting the other end of the straw rack, return grain pan, and grain pan from the separator housing, shoe hangers pivotally connected to each side of the separator housing, means pivotally connecting the shoe sieve to the shoe hangers, link means connecting the rocker arms and the shoe hangers, a transverse rotatable shaft associated with the separator housing, means for driving said shaft, and link means connected to the rocker arms at the point of connection of the straw rack thereto and to the rotatable shaft at a point spaced from the axis of rotation thereof.

5. In a harvester thresher, a transverse support, vertical members extending from the transverse support, a separator housing carried by the transverse support and the vertical members, longitudinally disposed members secured to the vertical members and extending along the sides of the separator housing, a rocker arm pivotally mounted at each side of the separator housing on the longitudinally disposed members, a straw rack within the separator housing, a transverse member associated with each end of the straw rack and extending outwardly through openings provided in the sides of the separator housing, one of said transverse members carried by said rocker arms, link means supporting the other transverse member from the separator housing, a return grain pan positioned beneath the straw rack, a transverse member associated with one end of the grain pan and extending outwardly through openings provided in the sides of the separator housing, said transverse member supported on the rocker arms, link means supporting the rear of the grain pan from the separator housing, a grain pan positioned beneath the return pan, means pivotally connecting one portion of the grain pan to the rocker arms, link means supporting another portion of the grain pan from the separator housing, a shoe sieve positioned below the grain pan, link means supporting one end of the shoe sieve from the separator housing, a shoe hanger pivotally mounted at each side of the separator housing, means pivotally connecting one end of the shoe hanger to the other end of the shoe sieve, link means connecting the shoe hangers and the rocker arms, a shaft rotatably associated with the transverse support, means for rotating said shaft, and link means connected to the transverse member of the straw rack supported by the rocker arms and to the rotatable shaft at a point spaced from the axis of rotation thereof.

6. In a mobile thresher, a transverse support having wheels rotatably mounted at the ends thereof, a second transverse support spaced from said first transverse support, means connecting the first transverse support with the second transverse support, a thresher separator housing carried by the second transverse support and the means connecting the supports, a rocker arm pivotally mounted at each side of the separator housing, a shaft rotatably associated with the second transverse support, means for driving said shaft, a transverse member associated with the rocker arms, a straw-rack carried by the transverse member, means associated with the separator housing for supporting the other end of the straw rack, a second transverse member associated with the rocker arms, a return grain pan carried by the second transverse member, means associated with the separator housing for supporting the other end of the return grain pan, a grain pan, means pivotally connecting one end of the grain pan to each of the rocker arms, means associated with the separator housing for supporting the other end of the grain pan, and link means connected to the first transverse member and to the rotatably mounted shaft at a point spaced from the axis of rotation thereof.

7. In a thresher, a first support, wheels carrying the same, a second support spaced from and generally above the first support, means connecting the supports, a housing carried by the second support and the means connecting the supports, the supports extending transversely of the housing, separating mechanisms positioned within the housing, means mounting the separating mechanisms for reciprocation in the housing, a driving shaft mounted at the second transverse support and extending therealong, and means connecting the driving shaft and the separating mechanisms for reciprocating the separating mechanisms.

ALBERT B. WELTY.